(No Model.) 2 Sheets—Sheet 1.

N. STAFFORD.
CLEANER ARM FOR THE TEETH OF HORSE HAY RAKES.

No. 381,593. Patented Apr. 24, 1888.

Witnesses:
Edwin H. Riley
Milton E. Robinson

Inventor:
N. Stafford.
By Risley Love & Perry
attys.

(No Model.)  2 Sheets—Sheet 2.

N. STAFFORD.
CLEANER ARM FOR THE TEETH OF HORSE HAY RAKES.

No. 381,593.  Patented Apr. 24, 1888.

Witnesses:
Edwin H Risley.
Milton E. Robinson.

Inventor:
N. Stafford
By Risley Quin & Perry.
Attys.

UNITED STATES PATENT OFFICE.

NORMAN STAFFORD, OF CANASTOTA, NEW YORK, ASSIGNOR TO PATTEN, STAFFORD & MYER, OF SAME PLACE.

CLEANER-ARM FOR THE TEETH OF HORSE HAY-RAKES.

SPECIFICATION forming part of Letters Patent No. 381,593, dated April 24, 1888.

Application filed November 11, 1886. Serial No. 918,646. (No model.)

*To all whom it may concern:*

Be it known that I, NORMAN STAFFORD, of Canastota, in the county of Madison and State of New York, have invented certain new and useful Improvements in Cleaners for Wheel-Rakes; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in an oscillating cleaner head and arms connected with a wheel-rake; and it consists in the mechanism hereinafter described and claimed.

Figure 1:
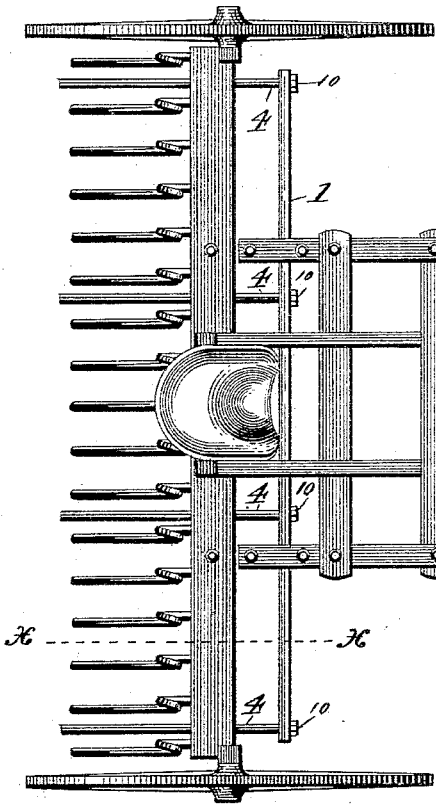
Figure 3:
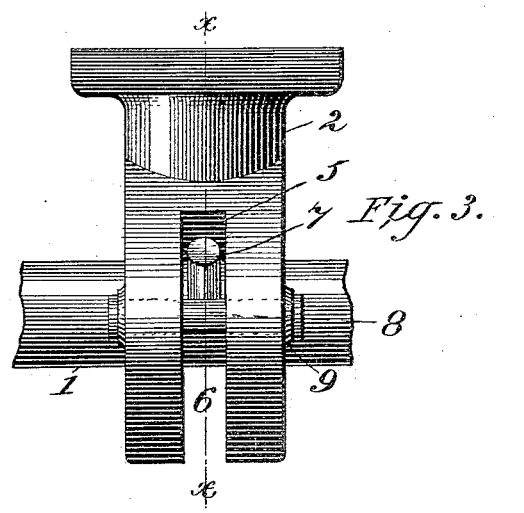
Figure 2:
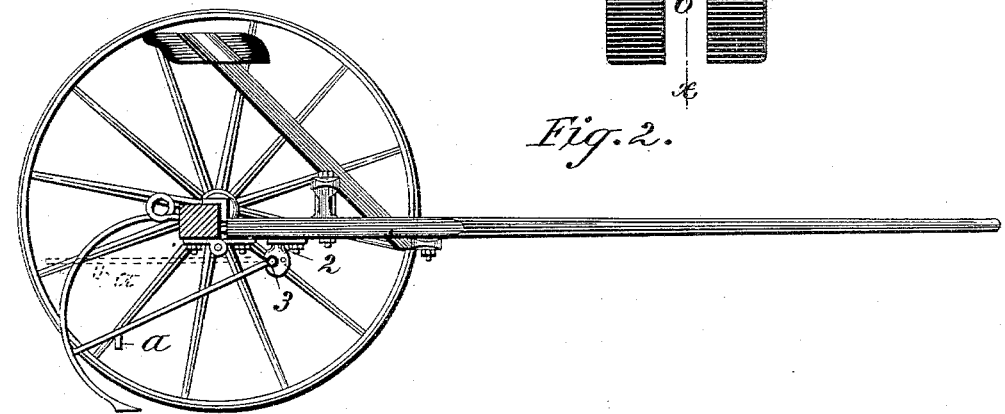
Figure 4:
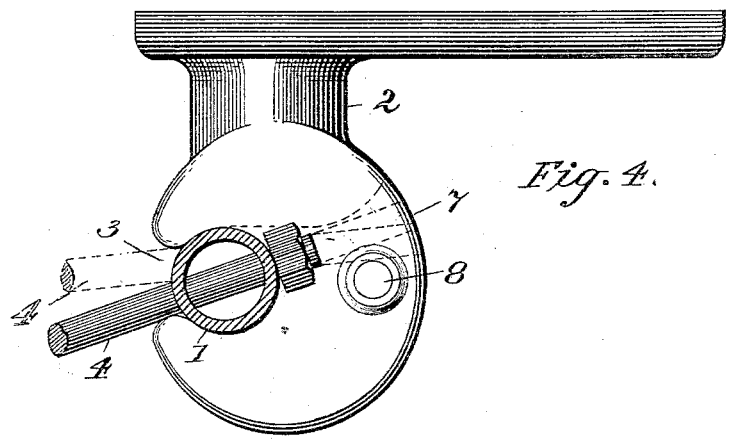
Figure 5:
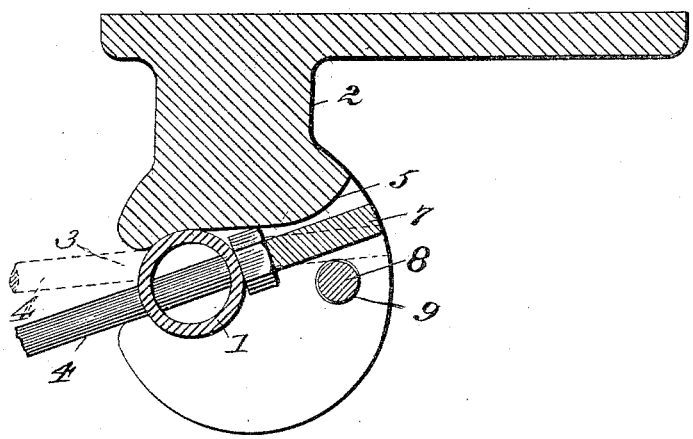
Figure 6:
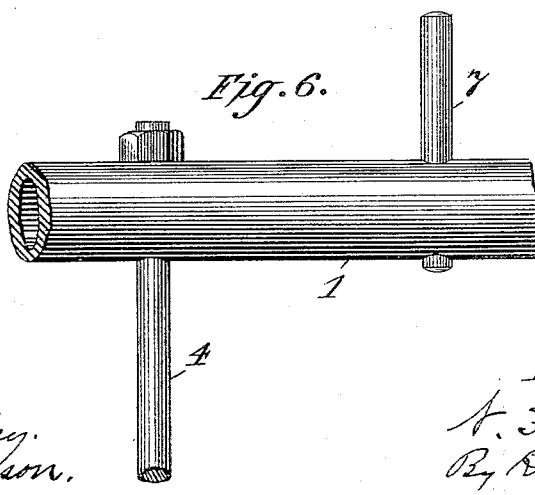

In the accompanying drawings, Figure 1 represents a plan view of my improved rake and cleaner arm. Fig. 2 represents a vertical section on line *x x*, Fig. 1. Fig. 3 is a front view of one of the clips. Fig. 4 is a side view of the same, dotted lines indicating the new position of the pin in the clip when the bolt is removed. Fig. 5 is a side view of the same, a portion of the clip being shown in section, the dotted lines indicating the new position of the pin when the bolt is removed, as hereinafter pointed out; and Fig. 6 represents a section of the cleaner-head with section of an arm and the pin attached thereto.

Heretofore cleaners have been furnished and applied to wheel-rakes with the arms extending between the teeth, substantially in the same horizontal plane with the axle-tree, and have been so provided for freeing the hay or straw from the teeth when the rake is dumped.

The purpose of my invention is to furnish a cleaner head and arm having a vertical oscillating motion held by clips to the under side of the shafts or tongue of the rake in front of and below the axle tree, the cleaner arms extending between the rake teeth, their extremities dropping nearly to the point of the teeth when in their normal position, from which position the cleaner-arms are left free to be elevated. When the hay or straw is gathered by the teeth and brought in contact with the cleaner-arms, the same are free to move upward by contact with the hay until the arms are brought substantially up to the under side of the axle tree, when their upward movement is limited by a bolt in each clip. The rear extremities of the cleaner-arms, when their upward movement is limited by the bolts, are below the points of the teeth when elevated for dumping the rake, by which arrangement the hay and straw are cleaned from the teeth. When the rake is dumped, the cleaner-arms are allowed to drop by gravity to their depressed position ready for use, as before mentioned. The purpose of the oscillating cleaner-arms being to pack the hay or straw as the same is accumulated above the rake-teeth and below the cleaner-arms, keeping the accumulating hay packed as the cleaner-arms are raised until they reach the limit of their motion, when the cleaner-arms are used for the purposes before described of freeing the hay from the rake-teeth.

Another important feature of my invention consists in furnishing an oscillating cleaner head and arm, the arms being so arranged that they may be moved upward until they strike the axle-tree upon the under side to allow the rake teeth to fill to their utmost capacity with hay or straw when the rake is used for bunching the windrows of hay. This is accomplished by the removal of the bolt in each of the clips, which allows the free upward movement of the arms, as described.

I attain these several beneficial results by providing what I term an "oscillating cleaner," having a head substantially the same length as the axle-tree provided with arms extending between the teeth of the rake.

The head 1 is mounted in clips fixed to the under side of the shafts or tongue in front of the axle-tree.

2 represents the clip, there being two or more in number, located under the shafts or on the cross-bar thereof in advance of the axle-tree. Each clip is provided with semicircular openings 3, so constructed and arranged as to receive and retain the tubular head in position in the clips, where the head is free to partially rotate. I insert in the head what I term "cleaner-arms" 4, which are held in the head by nuts 10 and extend between the teeth and back of them. The pins and head are mounted in the clip, the arms having a vertical oscillating motion which is limited by shoulder 5, Fig. 3, in the clip, which is formed with slot 6, Fig. 3. In this slot is a pin projecting from the head, which extends in the opposite direction from the cleaner-arm and is free to move when the arms are elevated by contact with the gathering hay in the teeth, the normal condition of the cleaner-arms being substantially shown in full lines in Fig. 2.

When pin 7 in the head strikes the shoulder 5, Fig. 3, in the clip as the head rocks, the ends of the cleaner-arms are prevented from striking the ground. As the hay is accumulated in front of the teeth in raking, the cleaner-arms are gradually raised by the hay or straw into the position shown in dotted lines, Fig. 2, at which point their upward motion is limited by the pins 7 striking the bolts 8, passing through the clips, as shown in Figs. 3, 4, and 5, through bolt-holes 9 in the walls of the clip, so that the bolt spans the slot in each of the clips. The pin engaging the bolt limits the upward movement of the cleaner-arms, which should be slightly below the ends of the rake-teeth when the same are elevated. When the hay is dumped from the rake, the cleaner-arms drop into their normal position by gravity, and these operations may be repeated.

When the rake is to be used for bunching windrows of hay or straw, the bolts should be removed from the clips, thereby allowing the cleaner-arms to be moved from their normal position upward until the same strike the under part of the axle-tree, which movement allows the teeth to be completely filled with hay, the cleaner-arms operating to pack the hay as the same is accumulated on the teeth, and the removal of the bolt allowing the teeth to be completely filled with hay, which would otherwise be prevented if the cleaner-arms were limited in their motion, as before stated.

Another important feature of my invention consists in providing on the under side of the cleaner arms one or more downward-projecting spurs, $a$, which engage the hay and prevent the same from rolling in the teeth under the cleaner-arms in light raking, and operate equally well to prevent the hay from rolling in heavy raking.

What I claim as new, and desire to secure by Letters Patent, is—

1. In a wheel-rake, the combination of the cleaner consisting of a head having arms projecting rearward therefrom between the teeth, the head mounted in clips on the under side of the shafts or tongue in front of and below the axle-tree to rock freely, so that the arms will have a vertical oscillating motion, pins projecting from the head and playing in the clips, and a bolt in the clips with which the pins engage to limit the rocking of the head, substantially as set forth.

2. The combination, in a wheel-rake, of the cleaner consisting of a head having arms projecting rearward therefrom between the teeth, the head mounted in clips on the under side of the shafts or tongue in front of and below the axle-tree to rock freely, so that the arms may oscillate, but be prevented from striking the ground by a pin projecting from a head and engaging the shoulder of the clip, and a bolt with which the pin also engages for limiting the upward movement of the arms, substantially as set forth, for the purposes stated.

3. In a wheel-rake, the combination of the cleaner consisting of a rocking head mounted in clips on the frame having arms extending therefrom between the teeth, the pins in the head, the shoulder in the clip for limiting the movement of the pins and preventing the cleaner-arms from coming in contact with the ground and leaving the same free to be elevated with the hay or straw, substantially as set forth.

4. In a wheel-rake, the combination of the cleaner consisting of a rocking head mounted in clips on the frame, arms extending between the teeth, the clips provided with the shoulder, and the bolt for limiting the rocking of the head and the movement of the cleaner-arms, substantially as set forth.

5. In a wheel-rake, the combination of the cleaners consisting of a rocking head mounted in clips on the frame, having pins forwardly projecting therefrom and arms rearwardly projecting therefrom between the teeth and provided with barbed projections near their rear end, the clips provided with a shoulder, and bolt for limiting the rocking of the head and the movement of the cleaner arms.

In witness whereof I have affixed my signature in presence of two witnesses.

NORMAN STAFFORD.

Witnesses:
EDWIN H. RISLEY,
D. McGUCKEN.